US006243950B1

(12) United States Patent
Wachiner et al.

(10) Patent No.: US 6,243,950 B1
(45) Date of Patent: Jun. 12, 2001

(54) PROCESS FOR REPAIRING A FRAMEWORK COMPOSED OF PROFILE SECTIONS, PARTICULARLY VEHICLE BODIES

(75) Inventors: Georg Christian Wachiner, Rosenheim; Peter Scheid, Peissenberg; Marinus Schouten, Darmstadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/377,348

(22) Filed: Aug. 19, 1999

(30) Foreign Application Priority Data

Aug. 19, 1998 (DE) ........................................ 198 37 597

(51) Int. Cl.[7] ........................................ B23P 6/00

(52) U.S. Cl. .................. 29/897.1; 29/402.12; 29/402.13; 29/402.14; 29/402.16; 29/897.2

(58) Field of Search ................................ 29/897.1, 897.2, 29/402.09, 402.12, 402.14, 402.11, 402.13, 402.16; 280/781, 797, 800; 296/146.5, 146.6, 185, 186, 187, 188, 195, 196, 197, 193, 203, 204, 205

(56) References Cited

U.S. PATENT DOCUMENTS 2,823,049 * 2/1958 Hombach .......................... 29/402.11
4,844,322 * 7/1989 Flowers et al. ................... 29/402.13
5,375,314 * 12/1994 Bora ................................. 29/402.13
5,781,995 * 7/1998 Anna et al. ....................... 29/402.11
5,920,976 * 7/1999 Grigory et al. ................... 29/402.12

FOREIGN PATENT DOCUMENTS

3811427 * 10/1989 (DE) .
0146716 * 7/1985 (EP) .
2093444 * 1/1972 (FR) .
2-74475 * 3/1990 (JP) .

* cited by examiner

*Primary Examiner*—P. W. Echols
*Assistant Examiner*—Trinh T. Nguyen
(74) *Attorney, Agent, or Firm*—Ladas & Parry

(57) ABSTRACT

A process for repairing a framework (1) composed of profile members, in particular for repairing the body structure of a vehicle in which a damaged subassembly (10) composed of several profile members (11–15) is removed by cutting through the profile members at locations which are still undamaged and replaced by a corresponding replacement subassembly (10E). For flush fitting of the replacement subassembly against the free ends of the cut profile members of the framework (1), a fitting case (20) is slidably inserted into the end of the respective profile members of the replacement subassembly or of the profile members of the framework. After positioning the replacement assembly the fitting cases are slidably displaced such that they extend partially into the abutting ends of the profile members. The profile members are then permanently secured to the fitting cases.

8 Claims, 3 Drawing Sheets

11
14
12
12T
10E
30
15
13

PROCESS FOR REPAIRING A FRAMEWORK COMPOSED OF PROFILE SECTIONS, PARTICULARLY VEHICLE BODIES

FIELD OF THE INVENTION

The invention relates to a process for repairing a framework composed of profile sections, particularly vehicle bodies, such as cabs of trucks.

BACKGROUND

When a framework composed of profile sections is damaged by buckling, bending or twisting it generally cannot be repaired by alignment, but only by replacing the deformed profile sections. Such damage often occurs with utility vehicles whose body structures usually consist of a framework made from profile sections. Heretofore, it has been customary to repair such framework by cutting out the damaged profile sections and replacing them individually. Depending on the material and the required strength, joining at the separation regions is effected by bonding, welding, riveting or a combination thereof. This has the disadvantage that each individual profile section has to be positioned and tensioned by means of a repair device before joining can take place. Depending on the number of damaged profile sections, this repair process is time-consuming and expensive.

SUMMARY OF THE INVENTION

It is thus an object of the present invention to provide a repair process by which a damaged framework composed of profile sections can be repaired rapidly with a minimum number of repair devices.

According to the invention, this object is satisfied by a process comprising the following steps:

removing a damaged section of said framework by cutting through a plurality of profile members at regions to separate the damaged section from undamaged profile members of the remaining framework;

placing a replacement subassembly in the framework such that free ends of profile members of the replacement subassembly abut against cut ends of the undamaged profile members of the framework at respective joints;

providing a slidable fitting case in one of the profile members at a respective one of said joints, said fitting case being retracted into the said one profile member to enable the ends of the profile members of the replacement assembly to abut against the cut ends of the profile members of the framework when the replacement subassembly is put into place in the framework;

sliding the fitting cases from the retracted positions within the respective profile members such that the fitting cases extend partially in said one profile members and partially into the adjoining profile members at the respective joints; and permanently joining the fitting cases to the respective profile members of the framework and of the replacement subassembly at said joints.

The process according to the invention provides a number of intrinsic advantages which decisively reduce the repair effort. By positioning the replacement subassembly by means of the fitting cases, there is no need for a repair device used for proper positioning of the repair component in relation to the entire framework. This not only saves the cost of the device itself but it also eliminates the respective set-up times for fixing the replacement profile sections. The process according to the invention provides a further decisive advantage in that it is not individual profile sections which are being replaced but instead the entire damaged section is cut and removed from the framework and replaced by the complete replacement subassembly comprising a plurality of profile members. Such insertion of a replacement subassembly whose ends of its profile members need to be joined to the framework in various directions becomes possible by means of the fitting cases. In this way, a repair shop can keep often-used replacement subassemblies in stock.

It is advantageous if, as is known per se, joining of the replacement subassembly and the framework is effected by bonding or welding. In a further embodiment of the invention, joining can also take place by riveting and it is also possible to use a combination of bonding and riveting.

A further advantageous embodiment of the process according to the invention provides for the outer surface of the fitting cases to be profiled so that hollow channels are formed between the interior surface of the profile members and the fitting case. Adhesive can be introduced into these hollow channels so that on the one hand an exact fit between the fitting case and the profile member is ensured while on the other hand an adequate amount of adhesive is available to establish the bonded connection.

A further embodiment of the invention provides for the fitting cases to comprise means for connecting an activating tool thereto so that said fitting cases can be slidably moved across the abutting ends of the profile members at the joints therebetween after positioning of the replacement subassembly. A screw thread is a preferred suitable means by which the activating tool is connectable to the fitting case. Furthermore, it is advantageous if the activating tool is guided outward from the profile members of the framework so that subsequently the necessary movement of the activating tool and thus the respective longitudinal sliding movement of the fitting case can be initiated. Finally, according to a further embodiment of the invention it is advantageous if an indicator means is provided at the point of exit of the activating tool from the profile members so that longitudinal displacement of the activating tool and thus of the respective fitting case can be accurately determined. This ensures that the fitting case extends approximately equally into the profile members at the abutting ends.

DETAILED DESCRIPTION

Figure 1:
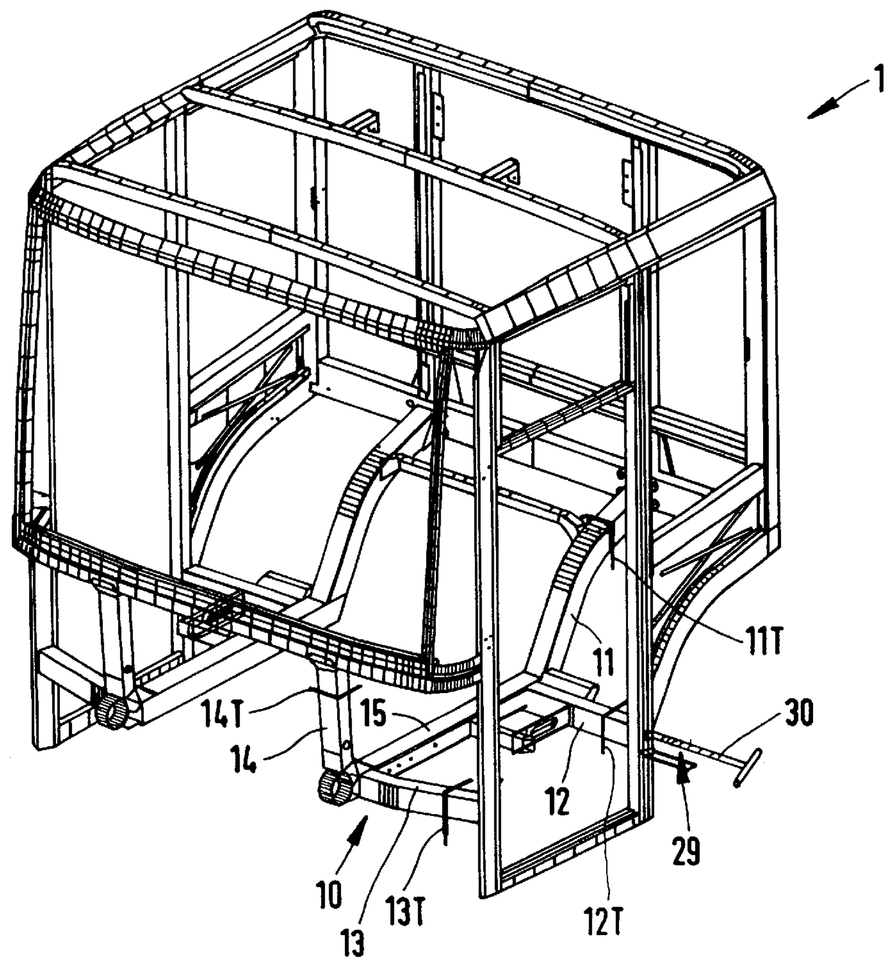
FIG. 1 is an oblique view of a body structure of a truck cabin in the form of a framework composed of profile members.
Figure 2:
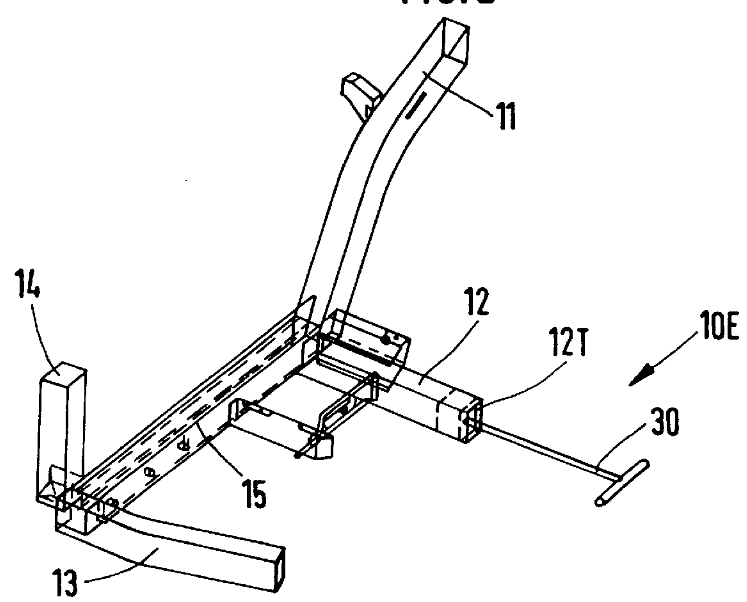
FIG. 2 shows a replacement subassembly comprising several profile members aligned in various directions for installation in the framework in FIG. 1.

The body structure 1 of a truck cabin shown in oblique projection in FIG. 1 comprises a framework composed of profile members. In the embodiment shown these profile members are structural tubing elements usually of square cross-section. The process according to the invention is directed to repairing such framework whether the profile members have closed, hollow profiles or partially open hollow profiles. A subassembly 10 which is assumed to be damaged, comprising profile members 11, 12, 13, 14 and 15, is to be replaced by new parts. FIG. 2 shows the corresponding new part forming the replacement subassembly 10E.

Figure 4:
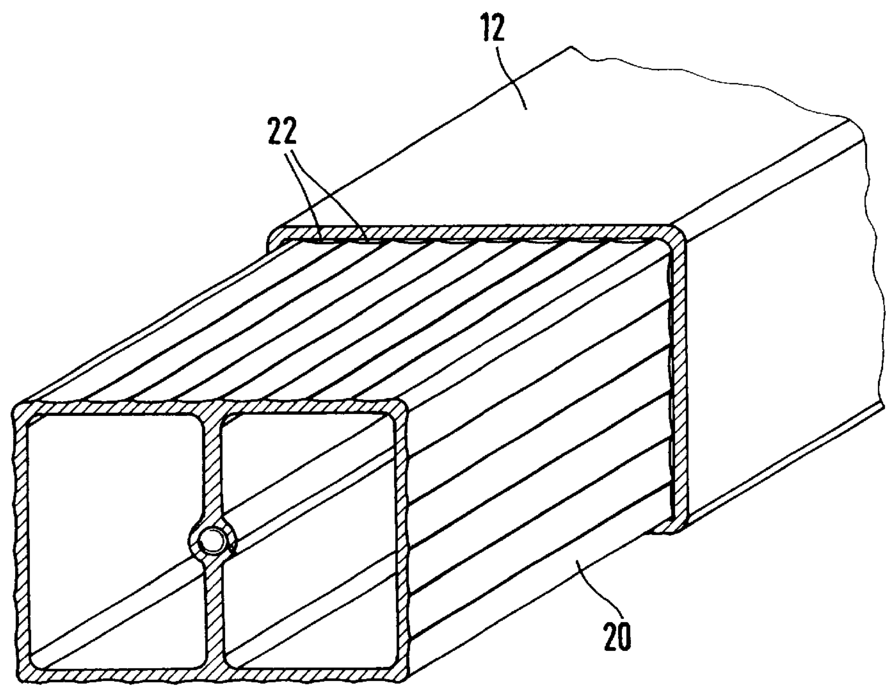
FIG. 4 is an enlarged view showing the fitting case partly inserted into the end of a profile member.

First, the damaged subassembly is cut out of the body structure at the separation regions 11T–14T in FIG. 1. On the free ends of the profile members 11, 12, 13, 14, fitting cases 20 are slidably inserted into the replacement subassembly 10E. Prior to positioning of the replacement subassembly 10E, the fitting cases 20 are pushed into the ends of the profile sections 11 to 14 so as to be flush with these ends. Then the replacement subassembly 10E can be positioned at the body structure such that the ends of the profile sections 11 to 14 abut against the separation regions 11T to 14T. By longitudinal sliding of the fitting cases 20 into the respective stubs of the profile members 11 to 14 of the body structure, secure positioning of tie replacement subassembly 10E to the body structure 1 is achieved. As shown in FIG. 2 of the fitting case of the profile section 12, longitudinal sliding of the fitting cases 20 takes place with activating tool 30. Depending on the intended type of connection between the replacement subassembly 10E and the body structure 1, fitting cases 20 with little play in the interior profile of the profile sections 11 to 14 are to be provided. This applies in particular if butt welding is used as a connection. If bonding is to be employed for connecting the replacement subassembly to the body structure, it is advantageous to profile the outer surfaces of the fitting cases 20 so that grooves 22 forming hollow channels are provided between the surface of the fitting case and the interior surface of the associated profile section (FIG. 4). These hollow channels are used to receive adhesive.

Figure 3:
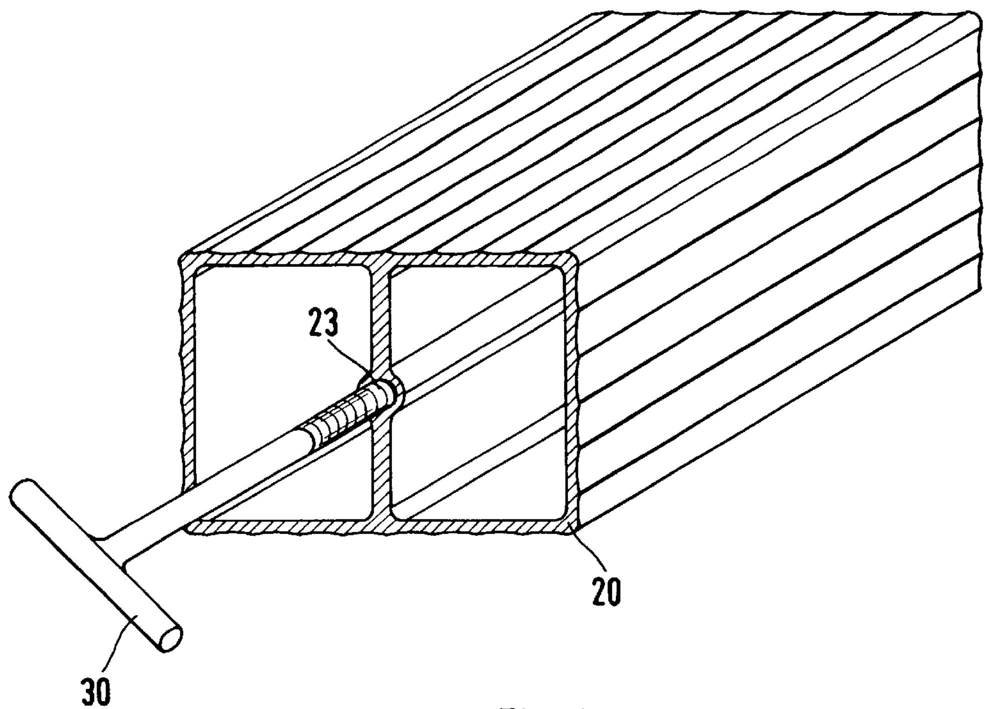
FIG. 3 is an enlarged view of a fitting case with a threaded activating tool for positioning the replacement subassembly in FIG. 2 on the framework in FIG. 1.

FIG. 3 shows a fitting case 20 at the front of which an activating tool 30 is connected by means of a screw thread 23. As shown in the embodiment according to FIG. 3, the activating tool 30 can be a threaded bolt screwed into a corresponding threaded hole in the fitting case. The bolt can also be engaged in a threaded-hole in a side wall of the fitting case. It is also possible that, instead of a screw connection, a clamping joint can be provided between the activating tool 30 and the fitting case 20, such that the clamping joint permits longitudinal sliding of the fitting case 20 in the profile sections. To be able to achieve the sliding movement by means of the activating tool 30 after the replacement subassembly has been placed in position, the activation tool 30 is preferably guided from the respective profile members of the body structure to the outside. This can be achieved in that the rod-shaped activating tool 30 is guided from the body structure through a respective hole, as indicated in FIG. 1. It is also possible to effect sliding of the fitting cases by means of a cable pulley arrangement temporarily affixed to said fitting cases 20. The cable then is guided from the inside of the structural tubing to the outside through a respective drill hole in the tubing and activated from the outside.

In the illustrated embodiment, the tool 30 is engaged in the fitting case and is used to push the fitting case into the profiled member. The tool is then unscrewed from the fitting case and the subassembly 10E is positioned in the framework. A hole is drilled in the framework to allow the tool 30 to be reinstalled into the fitting case to enable the fitting case to be slidably displaced to be engaged in both profile members at the joint.

It is advantageous if as shown in FIG. 1 that an indicator device 29 is provided at the exit of the activating tool 30 from the profile members for indicating longitudinal displacement of the fitting case, so as to ensure that the fitting case straddles the joint equally on both sides thereof.

The connection is made permanent after positioning the replacement subassembly 10E to the body structure 1 and after sliding the fitting cases 20 at the respective separation joints so that the fitting cases extend separately into the tubing of the framework and the tubing of the replacement subassembly.

Figure 5:
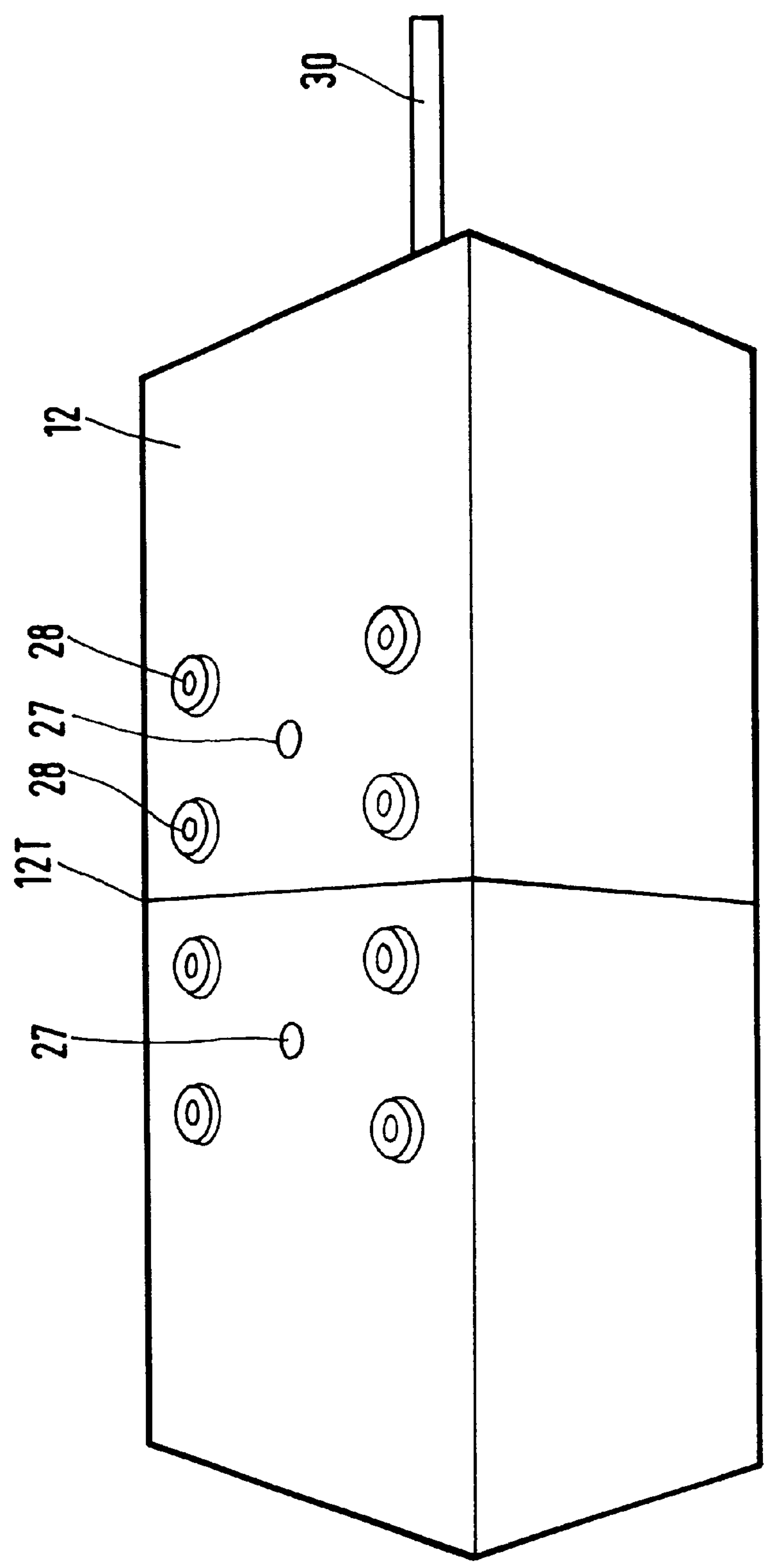
FIG. 5 shows a joint of abutting profile members connected by means of a fitting case by bonding and riveting.

FIG. 5 shows an embodiment of a joint where a profile member 12 has been joined at the separation region 12T by means of a fitting case 20 (not visible in FIG. 5) which is centered at the separation region. The connection is made by a combination of an adhesive connection and a riveted connection. Accordingly, the fitting case 20 has a grooved exterior surface as shown in FIGS. 3 and 4. The adhesive was previously fed through feed holes 27 in the walls of the profile members or the two ends of the profile members 12. The profile members are secured to the fitting case by conventional rivets 28. The activating tool 30 for sliding the fitting case is shown in FIG. 4 protruding from the right-hand end of the profile member. After the completion of the joint, the activating tool is removed.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A process for repairing a framework having hollow profile members, said process comprising:

removing a damaged subassembly composed of a plurality of profile members from said framework by cutting the profile members at undamaged regions thereof and separating the damaged subassembly from undamaged profile members of the remaining framework, placing a replacement subassembly in the framework such that free ends of profile members of the replacement subassembly adjoin and abut against cut ends of the undamaged profile members of the framework at respective joints, providing slidable fitting cases at said joints, each fitting case being provided in one of the profile members at each of said joints, each of said fitting cases being retracted into the said one of said profile members when the replacement subassembly is placed in the framework to enable the ends of the profile members of the replacement subassembly to abut against the cut ends of the profile members of the remaining framework, sliding each of the fitting cases from the retracted position within said one of said profile members, by means of an activating tool accessible from outside the framework after the ends of the profile members of the replacement subassembly have been abutted against the cut ends of the remaining framework such that each of the fitting cases extends partially in said one of said profile member of the replacement subassembly and partially in the adjoining profile member of the remaining framework at each of said joints, and permanently joining each of the fitting cases to each of the profile members of the remaining framework and of said one of said profile members of the replacement subassembly at each of said joints.

2. A process as claimed in claim 1, wherein the fitting cases are slidably fitted in the profile members of the replacement subassembly before the subassembly is put into place in the framework.

3. A process as claimed in claim 1, wherein the permanent joining of the fitting cases to the profile members is effected by bonding, welding, riveting or combinations thereof.

4. A process as claimed in claim 1, comprising forming the fitting cases with profiled outer surfaces so that channels are formed between the profiled outer surfaces of the fitting cases and the profiled members.

5. A process as claimed in claim 4, comprising introducing a bonding substance into said channels to bond the fitting cases and the profile members.

6. A process as claimed in claim 1, comprising threadably engaging said activating tool with said fitting case so that after the fitting case is permanently joined to the profile members the activating tool can be removed.

7. A process as claimed in claim 6, wherein said activating tools extends substantially axially within the profile member.

8. A process as claimed in claim 6, comprising providing indicator means on the activating tool to provide indication of magnitude of displacement of the activating tool and thereby providing magnitude of displacement of the fitting case.

* * * * *